Figure 1:
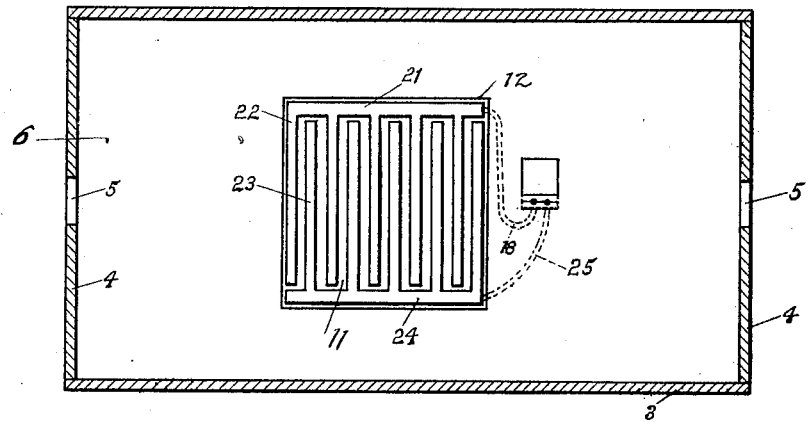

J. ENTWISTLE.
ELECTRIC TRAP.
APPLICATION FILED MAR. 24, 1911.

1,084,416.

Patented Jan. 13, 1914.

WITNESSES:
W. Castner
K. H. Butler

INVENTOR.
J. ENTWISTLE.
BY
ATTORNEYS.

UNITED STATES PATENT OFFICE.

JOSEPH ENTWISTLE, OF UTICA, NEW YORK.

ELECTRIC TRAP.

1,084,416.

Specification of Letters Patent.

Patented Jan. 13, 1914.

Application filed March 24, 1911. Serial No. 616,626.

*To all whom it may concern:*

Be it known that I, JOSEPH ENTWISTLE, a citizen of the United States of America, residing at No. 1004 Bleeker street, Utica, in the county of Oneida and State of New York, have invented certain new and useful Improvements in Electric Traps, of which the following is a specification, reference being had therein to the accompanying drawing.

This invention relates to electric traps particularly designed for shocking, electrocuting and collecting rats and other rodents.

The objects of this invention are to provide a trap of the above type that can be safely used without danger to the public or property, and to provide a trap that is positive in its action, self setting and free from injury by ordinary use.

Further objects of the invention are to provide an electric trap that will collect the bodies of dead rodents and prevent such bodies from interfering with successive operations of the trap, and to accomplish the above results by a trap that can be maintained in a sanitary condition and manufactured at a comparatively small cost.

With the above and other objects in view the invention resides in the novel construction, combination and arrangement of parts to be hereinafter specifically described and then claimed.

Reference will now be had to the drawing, wherein:—

Figure 2:
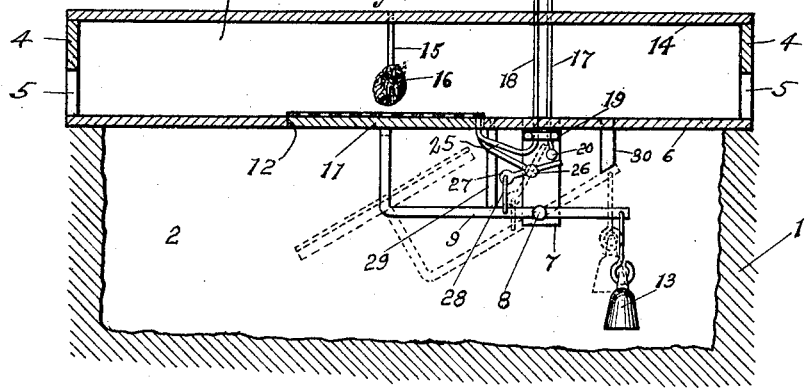
Figure 3:
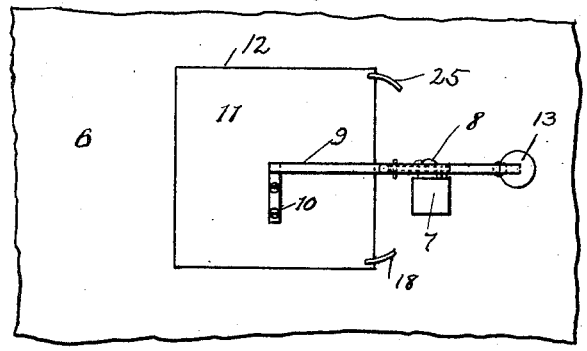

Figure 1 is a horizontal sectional view of the trap. Fig. 2 is a longitudinal sectional view of the same, and Fig. 3 is a bottom plan of a portion of the trap.

The reference numeral 1 denotes the ground or floor having a pit or well 2 and mounted over said pit or well and resting upon the ground or floor is a flat or rectangular box or casing 3 having the end walls 4 thereof provided with openings 5 whereby a rat or other rodent can enter the trap. The bottom of the box has a depending bearing 7 preferably made of insulation material and pivotally connected to the lower end of said bearing, as at 8 is a lever 9 having the forward end thereof bent upwardly and secured, as at 10 to the under side of a trap door 11 arranged in an opening 12 provided therefor in the bottom 6. The opposite end of the lever 9 is provided with a suspended counter-balance weight 13 adapted to normally maintain the trap door 11 in a closed position. Suspended from the roof 14 of the trap is a bait holder 15 provided with a bait 16 directly above the center portion of the door 11. Extending through the roof 14 of the trap are two leading-in wires 17 and 18, said wires extending through the box and the bottom 6 thereof and suitably clamped to the bearing 7 as by a strap 19. The lower end of the wire 17 is connected to a contact 20 and the lower end of the wire 18 is carried to the trap door 11 and connected to a longitudinal bus bar 21 arranged upon the door 11, said bus bar having parallel extensions 22 extending between similar extensions 23 of another bus bar 24. This latter bar is connected by a wire 25 to the fulcrum 26 of an arm 27. The arm 27 is carried by the bearing 7 and has the forward end thereof connected by a link 28 to the lever 9.

The closing movement of the trap door 11 is limited by a depending stop 29, carried by the bottom 6 and the opening movement of the trap door is limited by a similar stop 30. The weight of a rat upon the trap door 11 is sufficient to lower the same and through the medium of the lever 9 the contact arm 27 is shifted whereby the rear end thereof will wipe or contact with the contact 20. As the trap door 11 starts to open an electric circuit will be established through the bus bars 21 and 24 and the extensions thereof, and the rat or rodent will be shocked and electrocuted as the door descends. The rat will be deposited in the pit or well 2 and when the door 11 is relieved of the weight of the rat it will immediately close. The electric circuit will be broken and the trap will be in position to electrocute other rodents.

From the foregoing it will be observed that I have devised a trap that can be installed in large mercantile houses to destroy rodents that are destructive to merchandise. A series of traps may be employed and arranged to be easily controlled by suitable switches, and as the trap can be removed bodily from the top of the well or pit 2 the dead rodents can be easily removed.

What I claim is:—

1. In an electric trap, the combination with a floor having a well formed therein, of a box arranged over the well of said floor, a depending bearing carried by the bottom of said box, a lever pivotally connected to said bearing, a trap door supported by said lever and arranged in an opening provided therefor in the bottom of said box, bars arranged upon said door in insulated relationship and adapted to be put in circuit with a suitable source of electrical energy to provide an electrocuting circuit with said bars as terminals of such latter circuit, means carried by said bearing and actuated by a movement of said lever for controlling the electric circuit to said bars, and means carried by said lever and adapted to normally maintain said door in a closed position.

2. In a rat trap and in combination a tilting platform having a series of contact plates thereon insulated from each other and adapted to form the terminals of an electrocuting circuit, means for connecting the terminals of one sign permanently in circuit with a source of electric energy, and means for connecting the terminals of the opposite sign to such source by the tilting of the platform, said latter terminals being normally out of electric circuit, whereby the electrocuting circuit is provided by the tilting of the platform.

3. In a rat trap and in combination, a tilting platform having a plurality of contacts thereon insulated from each other and forming the terminals of an electrocuting circuit, means for connecting one of the terminals permanently in circuit with one side of a source of electric energy, and means for connecting a terminal of the opposite sign with the opposite side of such source by the tilting of the platform, said latter terminal being normally out of circuit.

4. The combination in a rat trap, of a tilting platform including a plurality of contact plates, part of said plates being insulated from the other part, one part of said contact plates being normally disconnected from a source of electric energy, means for connecting said part of the contact plates to one side of the source of electric energy by the tilting of the platform, and means constituting a connection between the other part of said contact plates and the other side of the source of electric energy when the platform is tilted.

5. The combination in a rat trap, of a tiltable platform including a plurality of contact plates, part of said plates being insulated from the other part, one part of said contact plates being normally disconnected from a source of electric energy, means for connecting said part of the contact plates to one side of the source of electric energy by the tilting of the platform, and means for connecting the other part of said contact plates and the other side of said source of electric energy.

In testimony whereof I affix my signature in the presence of two witnesses.

JOSEPH ENTWISTLE.

Witnesses:
GEORGE FOX,
EMERY DEMPSTER.

Copies of this patent may be obtained for five cents each, by addressing the "Commissioner of Patents, Washington, D. C."